A. E. PRESTON.
SPRAYING NOZZLE.
APPLICATION FILED AUG. 11, 1909.
940,477.
Patented Nov. 16, 1909.
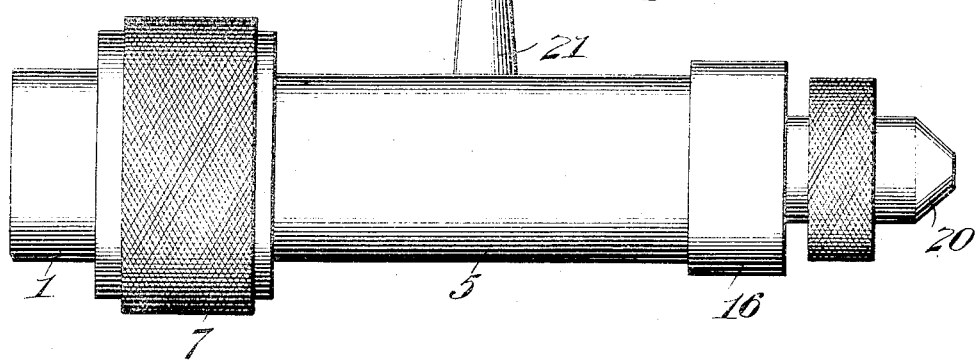
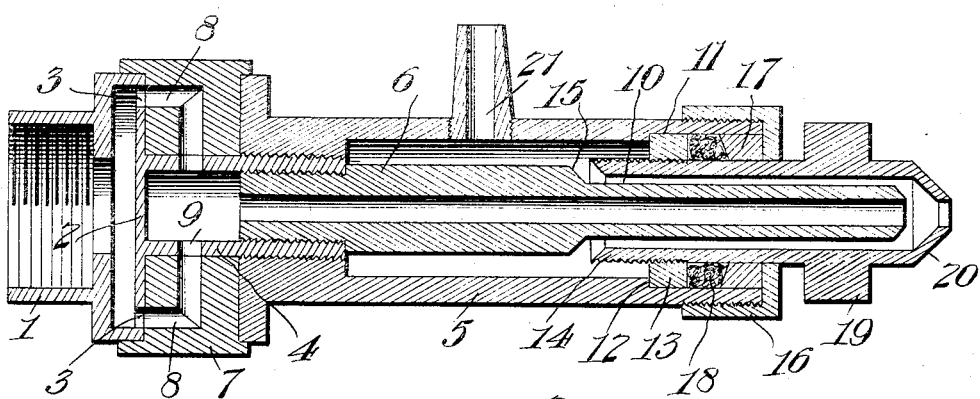
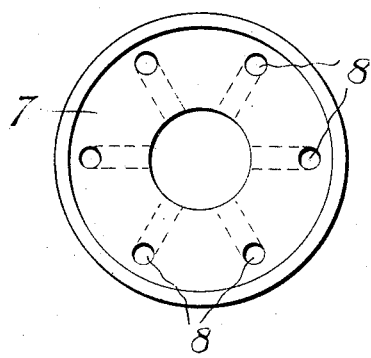
Witnesses
Inventor
Almon E. Preston
By Edson Bros.
Attorneys

UNITED STATES PATENT OFFICE.

ALMON E. PRESTON, OF BATTLE CREEK, MICHIGAN.

SPRAYING-NOZZLE.

940,477.

Specification of Letters Patent.   Patented Nov. 16, 1909.

Application filed August 11, 1909.   Serial No. 512,429.

*To all whom it may concern:*

Be it known that I, ALMON E. PRESTON, a citizen of the United States, residing at Battle Creek, in the county of Calhoun and State of Michigan, have invented certain new and useful Improvements in Spraying-Nozzles; and I do hereby declare the following to be a full, clear, and exact description of the invention, such as will enable others skilled in the art to which it appertains to make and use the same.

My invention relates to spraying nozzles and has for its object to so construct an ordinary garden hose nozzle that in addition to its general purpose it can be used as a sprayer for fruit trees and shrubbery and also for applying a liquid fertilizer to lawns and gardens.

The invention consists in the novel organizations or combinations of parts hereinafter described and specified in the claims.

In the accompanying drawing illustrating the preferred embodiment of my invention: Figure 1 is an elevation of the nozzle. Fig. 2 is a central longitudinal section thereof, and, Fig. 3 is a detailed view of the valve-ring or cut off device.

Referring more particularly to the drawing, 1 designates a part adapted to be screwed on the end of a hose and having its end closed, as at 2, except for a series of openings or perforations 3 arranged near the periphery thereof. A tubular extension 4 is fixed to the opposite side of the closure plate 2 interiorly of the perforations 3. Said tubular projection 4 is screw-threaded internally and externally and is engaged on its outer face by a tube 5 while another tube 6, of less diameter than the tube 5, engages its interior screw threads.

Between the closure plate 2 of the part 1 and the adjacent end of the tube 5, and mounted to turn upon the tubular projection 4 is a ring-valve 7 having passages 8 formed therein adapted to register with the perforations 3 and also with other perforations 9 in said tubular projection. It will be understood that said ring may be turned to bring the passages 8 out of alinement with the perforations 3 and 9, and that the flow of water from the part 1 to the interior of the tubular projection will then be cut off. The periphery of the valve-ring extends beyond the other parts of the nozzle and is preferably milled whereby it may be conveniently grasped and turned for controlling the flow of water through the nozzle.

The inner tube 6 extends beyond the outer tube 5 and is reduced on its outer surface, as at 10, from a point interiorly of the end of said outer tube. The inner surface of the outer tube at the extremity thereof, is cut away, as at 11, thereby enlarging the diameter of the chamber formed therein and providing a shoulder 12 at the inner end of said enlarged portion. An internally screw-threaded ring 13 is fitted in said enlarged portion 11 and abuts against said shoulder 12. Another tube 14 has screw connection with the interior of the ring 13 and is of such internal diameter as to leave a passage between it and the reduced portion of the inner tube 6, and so as to also permit the end of said tube 14 to contact with the shoulder 15 on said tube 6 at the end of said reduced portion for the purpose to be hereinafter explained.

The ring 13 is held in place and air is excluded from the chamber between the outer tube 5 and the inner tube 6 by means of a screw-threaded cap 16, a washer 17 and suitable packing material 18 all fitted around the tube 14. Beyond said cap, the last mentioned tube is provided with a milled band 19 by means of which said tube may be turned for moving the same inward or outward to suit requirements. The outer extremity 20 of said tube 14 is drawn in to conform to the corresponding end of the inner tube 6 so that the opening in that end of said tube 14 is of substantially the same diameter as the bore of said tube 6.

The outer tube 5 is provided with a port 21 adapted to be connected in a suitable manner with a receptacle (not shown) containing the spraying fluid or liquid fertilizer. When in use for either spraying or applying the liquid fertilizer, the tube 14 is adjusted so as to leave an opening between its inner end and the shoulder 15. The ring valve is adjusted so as to admit water under pressure into the tubular extension 4. The forcing of the water through the inner tube 6 past the opening at the end thereof leading from the chamber arranged between the restricted portion of said tube and the tube 14 will create a suction through the port 21 and draw the spraying fluid or liquid fertilizer into the nozzle where it will become mixed with the water at the point of discharge and the mixture delivered upon trees, shrubbery or lawns, as may be desired. It will be understood that the strength of the mixture may be regulated by adjusting the tube 14 to decrease or increase the size of the opening between its inner end and the shoulder 15. When the inner end of said tube 14 is engaged with said shoulder, the flow of the spraying fluid or liquid fertilizer will be cut off entirely and pure water discharged through the nozzle. By means of this adjustment the nozzle may be used for ordinary sprinkling or watering purposes when desired, no connection with the port 21 being necessary at such times. It will be further observed that the flow of the spraying fluid or liquid fertilizer and the water may be cut off simultaneously by means of the valve-ring.

I claim:—

1. In a nozzle of the character described, the combination, with an inner tube, and means for feeding a fluid under pressure therethrough, of an outer tube spaced away from said inner tube and having a port for connection with a source of supply of another fluid, an adjustable tube arranged intermediate of said inner and outer tubes and projecting beyond the same forming a chamber between it and the outer portion of said inner tube, and an air tight closure between the end of said outer tube and said intermediate tube, the outer extremity of said intermediate tube being drawn in around the end of the inner tube for the purpose specified.

2. In a nozzle of the character described, the combination, with an inner tube, and means for feeding a fluid under pressure therethrough, of an outer tube spaced away from said inner tube and having a port for connection with a source of supply of another fluid, an adjustable tube arranged intermediate of said inner and outer tubes and projecting beyond the same forming a chamber between it and the outer portion of said inner tube, the inner end of said intermediate tube being adapted to abut against a shoulder on said inner tube, the outer extremity of said intermediate tube being drawn in around the end of said inner tube for the purpose specified, and an air tight closure between the end of said outer tube and said intermediate tube.

3. In a nozzle of the character described, the combination, with an inner tube and means for feeding a fluid under pressure therethrough, of an outer tube spaced away from said inner tube and provided with a port for connection with a source of supply of another fluid, an internally screw-threaded ring fitted in the end of said outer tube, an intermediate tube extending beyond said inner and outer tubes and having screw-threaded connection with said ring, said intermediate tube being spaced away from said inner tube forming a chamber between them, the inner end of said intermediate tube being adapted to abut against a shoulder on said inner tube for the purpose specified, and an air tight closure between the extremity of said outer tube and said intermediate tube.

4. In a nozzle of the character described, the combination, with an inner tube and means for feeding a fluid under pressure therethrough, of an outer tube spaced away from said inner tube and provided with a port for connection with a source of supply of another fluid, an internally screw-threaded ring fitted in the end of said outer tube, an intermediate tube extending beyond said inner and outer tubes and having a screw-threaded connection with said ring, said intermediate tube being spaced away from said inner tube forming a chamber between them, the inner end of said intermediate tube being adapted to abut against a shoulder on said inner tube and its outer end drawn in around the extremity of said inner tube for the purposes specified, and an air tight closure between the extremity of said outer tube and said intermediate tube.

5. In a nozzle of the character described, the combination, with an inner tube and means for feeding a fluid under pressure therethrough, of an outer tube spaced away from said inner tube and provided with a port for connection with a source of supply of another fluid, an internally screw-threaded ring fitted in the end of said outer tube, an intermediate tube extending beyond said inner and outer tubes and having screw-threaded connection with said ring, said intermediate tube being spaced away from said inner tube forming a chamber between them, the inner end of said intermediate tube being adapted to abut against a shoulder on said inner tube for the purpose specified, a milled band on said intermediate tube for adjusting the latter, and an air tight closure between the extremity of said outer tube and said intermediate tube.

6. A nozzle of the character described, comprising a part adapted to be attached to a garden hose and having a perforated closure plate at its end, a tubular projection on said plate interior of the perforations therein, outer and inner tubes connected respectively to the outer and inner surfaces of said tubular projection, the latter having perforations formed therein intermediate of said closure plate and the adjacent end of the outer tube, a valve-ring fitted between said closure plate and the adjacent end of said outer tube, said valve-ring having passages therein adapted to register with the perforations in said closure plate and tubular projection for the purpose specified, means for feeding a fluid into a chamber formed between said outer and inner tubes and means for mixing said fluid with the water which passes through said inner tube before it is discharged.

In testimony whereof, I affix my signature, in presence of two witnesses.

ALMON E. PRESTON.

Witnesses:
G. J. ASHLEY,
JOHN H. STEPHENS.